United States Patent [19]
Frevel et al.

[11] 3,868,444
[45] Feb. 25, 1975

[54] PROCESS FOR THE PREPARATION OF POROUS SODIUM BICARBONATE

[75] Inventors: Ludo K. Frevel, Midland; Leonard J. Kressley, Saginaw, both of Mich.

[73] Assignee: The Dow Chemical Company, Midland, Mich.

[22] Filed: Nov. 26, 1969

[21] Appl. No.: 880,424

[52] U.S. Cl. ............................... 423/422, 423/423
[51] Int. Cl. .............................................. C01d 7/10
[58] Field of Search .......................... 23/63–65, 302; 252/476–477; 423/422, 423

[56] References Cited
UNITED STATES PATENTS

| | | | |
|---|---|---|---|
| 1,384,141 | 7/1921 | MacMahon | 23/65 |
| 1,865,833 | 7/1932 | Chesny | 23/64 |
| 2,013,977 | 9/1935 | Weiss | 23/64 |
| 2,792,283 | 5/1957 | Hill | 23/64 |
| 2,926,995 | 3/1960 | Mod et al. | 23/64 |
| 3,222,231 | 12/1965 | Markels, Jr. et al. | 23/295 |
| 3,368,866 | 2/1968 | Seguela | 23/65 X |
| 3,493,329 | 2/1970 | Stiers | 23/63 X |

OTHER PUBLICATIONS
"Chemical Abstracts," Vol. 64, 1966, p. 17095.

Saeman; W. C., "Industrial & Engineering Chemistry," Vol. 53, No. 8, Aug. 1961, pp. 612–622.

*Primary Examiner*—G. O. Peters
*Attorney, Agent, or Firm*—Edward E. Schilling

[57] ABSTRACT

Disclosed is a process for preparing hard, porous granules of sodium bicarbonate having a surface area greater than 0.5 square meter per gram. The process involves reacting ammonium bicarbonate with a soluble sodium salt in aqueous solution wherein the concentration $Na^+$ is greater than about 2.5 gram ions per liter and the concentration of $HCO_3^-$ is greater than about 0.04 gram ions per liter, while agitating the solution and adding carbon dioxide thereto in an amount sufficient to create a partial pressure of from 15 to 40 psig. The sodium bicarbonate crystals formed during the reaction are separated from the aqueous solution and dried at a temperature of from about 20° to about 75°C. The sodium bicarbonate product is especially useful for removing $SO_2$, as well as other acid gases, from flue gas due to its high surface area.

12 Claims, No Drawings

3,868,444

PROCESS FOR THE PREPARATION OF POROUS SODIUM BICARBONATE

BACKGROUND OF THE INVENTION

Among the uses for sodium bicarbonate is that of absorbing $SO_2$ from flue gas to abate air pollution. It is reported in the June 2, 1969 issue of *Chemical and Engineering News* at page 39 that sodium bicarbonate in the form of nahcolite ore has been successfully employed to absorb $SO_2$ from flue gas streams. This reference goes on to state that a major holdup on the system is mineral supply. Another disadvantage in the use of nahcolite is that is has a relatively low porosity and a correspondingly low surface area. A sodium bicarbonate form having a porosity of greater than 20 percent and surface area greater than about 0.5 square meter per gram is preferred for absorbing $SO_2$ from flue gas due to the relatively large surface area available for contact with the gas. Additionally, sodium bicarbonate used for absorbing $SO_2$ should have sufficient structural strength to retain particle integrity. This facilitates handling in a dry absorption system such as a grate or a moving porous belt placed in the gas stream. High granule strength is also advantageous to the employment of the bicarbonate in a moving bed gas-solids contacting system.

Accordingly, it would be desirable and objects of the invention are to provide hard porous sodium bicarbonate granules which have a surface area greater than 0.5 square meter per gram as well as a porosity of greater than 20 percent and a novel process for the preparation of such hard porous sodium bicarbonate granules.

SUMMARY OF THE INVENTION

The present invention is a process for the preparation of hard porous sodium bicarbonate granules which involves reacting ammonium bicarbonate with a soluble sodium salt in aqueous solution. The concentration of sodium ion in the solution is greater than about 2.5 gram ions per liter and the bicarbonate ion concentration is greater than about 0.04 gram ions per liter. During the reaction, the solution is agitated vigorously and carbon dioxide is introduced in sufficient quantity to produce a carbon dioxide partial pressure of from about 15 to about 40 psig. Fine sodium bicarbonate crystals are formed and precipitated. The crystals are separated from the aqueous solution, compacted and dried at a temperature of from about 20° to 75°C. In a preferred embodiment, compaction is achieved simultaneously with separation by filtering the system to form a filter cake of the carbonate crystals. The filter cake is then dried and broken or fractured to provide a desired granule size.

The process produces hard sodium bicarbonate granules which have a surface area of greater than 0.5 square meter per gram and greater than 20 percent porosity.

DETAILED DESCRIPTION OF THE INVENTION

In the practice of the present process, a sodium ion concentration of greater than 2.5 gram ions per liter and a bicarbonate ion concentration of greater than 0.04 gram ions per liter is employed to cause precipitation of sodium bicarbonate crystals. Normally, higher concentrations are employed to provide substantial precipitation. A sodium ion concentration of from about 5 to 7 gram ions per liter is preferred. The $NA^+$ concentration is normally kept below 13 gram ions per liter for ease of operation. The process works well with a bicarbonate concentration of from 0.08 to 0.12 gram ions per liter. At temperatures substantially above 22°C., it may be desirable to increase bicarbonate concentration to insure efficient $NaHCO_3$ precipitation.

The reaction liquor should be vigorously agitated while the reaction is taking place. The agitation should be vigorous enough to cause the sodium bicarbonate to precipitate as essentially uniform crystals, each crystal having a maximum dimension within the range from 1 to about 10 microns. Such agitation can be produced in a number of conventional ways, such as violent shaking of the reaction vessel. Stirring with a high speed impeller is a preferred method of causing agitation.

The introduction of carbon dioxide in sufficient quantity to produce an internal $CO_2$ partial pressure of about 15 to about 40 psig is necessary for the production of the porous sodium bicarbonate forms. A $CO_2$ partial pressure of from 20 to 30 psig is preferred. The total gas pressure in the reaction vessel is not critical, although for ease of operation a total pressure of greater than 1,000 psig, and preferably 75 psig, should not be exceeded.

The reaction is continued for a period of time sufficient to permit the sodium and bicarbonate ions present to form sodium bicarbonate in excess of its solubility limit under the reaction conditions and precipitate as fine crystals. After the crystals have precipitated, they are separated from the reaction liquor and compacted by conventional solids-liquid separating means such as filtration, settling and centrifugation. After separation of the crystals from the reaction liquor and compaction, the crystals are dried at a temperature of from about 20° to 75°C. and preferably 30° to 40°C. The drying step is conveniently carried out by passing a stream of warm air over and through the filter cake. Complete water removal is not necessary; however, the filter cake should be sufficiently dried so as to be self supporting. Drying time will vary with temperature. In general, a period of at least 24 hours is desirable for substantially complete drying. The dried sodium bicarbonate produces, upon grinding, hard porous granules possessing excellent structural integrity against abrasion as the result of physical manipulation.

Sufficient sodium and bicarbonate ion to precipitate sodium bicarbonate crystals can be introduced to the reaction vessel by a variety of means. For example, ammonium bicarbonate and sodium hydroxide, when contacted in sufficiently high concentration, will precipitate sodium bicarbonate. A convenient method of forming sodium bicarbonate is by introducing carbon dioxide into a sodium hydroxide solution in the presence of small amounts, usually less than 3 weight percent, of ammonia. In this embodiment, the sodium hydroxide solution should have a concentration of from about 6 to about 30 weight percent. If needed to meet the required sodium concentration, sufficient sodium salt, usually sodium chloride, is introduced to bring the sodium ion concentration up to at least about 2.5 gram ions per liter. Ammonia can be introduced as the anhydrous gas to react with the sodium hydroxide, carbon dioxide and water to form ammonium bicarbonate in situ. During the course of the reaction, sodium carbonate is formed by the reaction between sodium hydroxide and carbon dioxide. The ammonium bicarbonate formed in situ catalyzes a reaction between the sodium carbonate, carbon dioxide and water to form sodium bicarbonate. Alternatively, the ammonia can be introduced in the form of ammonium bicarbonate. When sodium bicarbonate is made by the described ammonia process, carbon dioxide enters into the reaction making a continuing gas supply necessary to maintain carbon dioxide pressure within the required range.

A readily available source of sodium ion is the effluent from a diaphram-type electrolytic cell which normally contains from 8 to 15 weight percent sodium hydroxide and from 10 to 15 weight percent sodium chloride.

Sodium bicarbonate crystals are also formed by reacting Trona ore ($Na_2CO_3 \cdot NaHCO_3$) with ammonia and carbon dioxide under pressure. In this embodiment, the sodium ion concentration, partial pressure of carbon dioxide and ammonia concentration are controlled as previously described.

After removal of precipitated sodium bicarbonate from the reaction liquor as a wet solid, the filtrate contains NaCl, $NH_4Cl$ when NaCl is used to increase the $Na^+$ concentration and unprecipitated $NaHCO_3$ in solution. When sufficiently small amounts of ammonium or ammonium bicarbonate are used so that the $NH_4Cl$ formed will just be neutralized by the unprecipitated $NaHCO_3$, most economical operation results. This is because upon heating the filtrate to greater than about 100°C., ammonia is recovered by a reaction represented by the following equation:

The liberated ammonia can be recovered for reuse in a cyclic system. The use of ammonia or ammonium bicarbonate in quantities which produce ammonium chloride in amounts stoichiometric for the above reaction, minimize loss of ammonia thereby reducing the cost of the process. The carbon dioxide recovered can also be recycled into additional cell effluent to form additional sodium bicarbonate.

Sodium bicarbonate crystals can also be formed by the classical Solvay process, i.e. double decomposition reaction between ammonium bicarbonate and sodium chloride. In this embodiment, carbon dioxide does not enter into the reaction but its introduction to the reaction liquor under the pressure conditions previously set out is necessary for formation of the porous sodium bicarbonate granules of the present invention.

The invention is further illustrated by the following examples:

EXAMPLE I

A jacketed stainless steel reactor having an internal volume of approximately 1 liter and fitted with a tubular shaft having four-bladed impellers spaced at 4.5 inches intervals was charged with 500 ml. (607 gm) of chlorine cell effluent to which was added 25 gm of NaCl and 15 gm of $NH_4HCO_3$ (equivalent to 2.8 gm $NH_3$). The cell effluent contained 16% NaCl and 7.86% NaOH, making the total sodium ion concentration of the reaction liquor 5.55 gram ions per liter. The impeller blades had holes drilled in their edges which communicated with the hollow shaft. With adequate stirrer speed,~1,725 r.p.m. in these examples, gas from the upper part of the reactor was pumped down through the shaft, through the impeller opening and redispersed through the reactor. $CO_2$ was also injected into the lower part of the reactor through a ¼ inch stainless steel tube.

After closing the reactor and connecting lines, the reactor was evacuated to about 15 m.m. Hg, the stirrer started and $CO_2$ allowed to pass in at a rate of 1.2 liters per minute. As pressure increased in the system, the inlet valve was adjusted to maintain the gas flow. After about 15 minutes, the pressure within the reactor was nearly equal to the feed pressure ( −24 psig) and the flow dropped off. A short revival of reactivity was noted several times at this stage followed by a lessening of $CO_2$ uptake during the next 1 to 2 hours. During a run of 3 hours and 28 minutes, a total of 62 gm of $CO_2$ was added. The temperature varied from 15° to 29°C.

After the reaction had gone to completion, as evidenced by the cessation of $CO_2$ flow, the reactor was drained and the product filtered in a centrifuge directly under the reactor. In operating the centrifuge, attempts were made to minimize the amount of cracking of the filter cake, caused by shrinking as the liquor was spun out, by adding product in incremental amounts and allowing each to spin out well before the next addition. The filter cake was removed wet and dried for about 24 hours at 35°C. The dry weight was recorded and the NaCl content determined by silver precipitation. The dried sodium bicarbonate cake was hard, yet porous. The mercury porosimetry measurement gave a porosity value of 33 percent. The Brunauer-Emmett-Teller (BET) surface area was determined to be 0.57 m²/gm. The dried cake weighed 113.4 gm. (111.4 gm. $NaHCO_3$ + 2.0 gm. NaCl) which represented a 93.4 percent yield based on NaOH as the limiting substance.

EXAMPLE II

In a manner similar to that of Example I, 733 gm of chlorine cell effluent, 60 gm of NaCl and 14 gm $NH_4HCO_3$ were charged to the reactor. The NaOH content of the cell effluent was 7.83 percent and the NaCl content was 16.0 percent, providing a solution with a sodium ion concentration of 6.42 gram ions per liter. During a total reaction time of 5 hours during which 67 gm of carbon dioxide was charged, the pressure in the reactor reached 23 psig. The reactor temperature varied from 22° to 29°C. Sodium bicarbonate was formed in the amount of 123 gm. which was found to contain 1.7% NaCl. The $NaHCO_3$ cake which was dried at 35°C. for 30 hours was found to have a BET surface area of 1.11 m²/gm.

EXAMPLE III

In a manner similar to that of Example I, 609 gms. of cell effluent, 50 gms. of NaCl and 12 gms. of $NH_4HCO_3$ were charged to the reactor. The internal pressure was brought up to 24 psig during the reaction time of 1 hour. The sodium bicarbonate filter cake was washed, but not as extensively as in the previous examples. After drying at 30°C. for 24 hours, the dried cake weighed 140 gms. (108 gms. $NaHCO_3$ + 32 gms. NaCl). The dried cake, which was hard and porous, was found to have a BET surface of 1.02 m²/mg.

We claim:
1. A process which comprises:
   a. reacting ammonium bicarbonate with a soluble sodium salt in aqueous solution, wherein the concentration of sodium ion is greater than about 2.5 gram ions per liter and the bicarbonate ion concentration is greater than about 0.04 gram ions per liter, in the presence of carbon dioxide in sufficient quantity to create a partial pressure of from 15 to 40 psig while agitating the solution with sufficient vigor to form crystals of sodium bicarbonate having longest dimensions which vary from 1 to 10 microns;

b. separating the sodium bicarbonate crystals from the solution and compacting them; and c. drying the crystals at a temperature of from about 20° to about 75° C.

2. The process of claim 1 wherein the sodium ion concentration is 5 to 7 gram ions per liter.

3. The process of claim 1 wherein the sodium ion concentration is less than 13 gram ions per liter.

4. The process of claim 1 wherein the bicarbonate concentration is from 0.08 to 0.12 gram ions per liter.

5. The process of claim 1 wherein the partial pressure of carbon dioxide is from 20 to 30 psig.

6. The process of claim 1 wherein the total pressure is 75 psig.

7. The process of claim 1 wherein the sodium bicarbonate crystals are separated from the solution and compacted by filtration.

8. The process of claim 1 wherein the sodium bicarbonate crystals are dried at a temperature of from 30° to 40°C.

9. A process for the preparation of hard porous granules of sodium bicarbonate which comprises:

a. reacting a 6 to 30 weight percent solution of sodium hydroxide to which has been added a sufficient amount of a sodium salt to produce a solution having a sodium ion concentration of at least about 2.5 gram ions per liter with ammonia and carbon dioxide wherein the carbon dioxide is present in an amount sufficient to produce a partial pressure of from 15 to 40 psig while agitating the solution with sufficient vigor to form crystals of sodium bicarbonate having longest dimensions which vary from 1 to 10 microns;

b. separating the sodium bicarbonate from the solution; and c. drying the sodium bicarbonate crystals at a temperature of from about 20° to about 75°C.

10. The process of claim 9 wherein ammonia is in an amount less than 3 weight percent of the solution.

11. A process for the preparation of hard porous granules of sodium bicarbonate which comprises:

a. reacting ammonium bicarbonate and carbon dioxide with a 6 to 30 weight percent solution of sodium hydroxide to which has been added a sufficient amount of a sodium salt to produce a solution having a sodium ion concentration of at least about 2.5 gram ions per liter wherein the carbon dioxide is present in an amount sufficient to produce a partial pressure of from 15 to 40 psig while agitating the solution with sufficient vigor to form crystals of sodium bicarbonate having longest dimensions which vary from 1 to 10 microns;

b. separating the sodium bicarbonate crystals from the solution; and c. drying the sodium bicarbonate crystals at a temperature of from about 20° to about 75° C.

12. The process of claim 11 wherein the solution contains 8 to 15 weight percent sodium hydroxide and from 10 to 15 weight percent sodium chloride.

* * * * *